United States Patent
Ji et al.

(10) Patent No.: US 9,184,796 B2
(45) Date of Patent: Nov. 10, 2015

(54) APPARATUS AND METHOD FOR OPERATING ANTENNAS

(71) Applicant: Samsung Electronics Co., Ltd, Gyeonggi-do (KR)

(72) Inventors: Junhak Ji, Gangwon-do (KR); Yongyi Kim, Gyeonggi-do (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 68 days.

(21) Appl. No.: 13/935,471

(22) Filed: Jul. 3, 2013

(65) Prior Publication Data

US 2014/0011452 A1    Jan. 9, 2014

(30) Foreign Application Priority Data

Jul. 3, 2012 (KR) ................. 10-2012-0072017

(51) Int. Cl.
 H04B 5/00 (2006.01)
 H04B 5/06 (2006.01)
 H04B 7/08 (2006.01)
(52) U.S. Cl.
 CPC .. *H04B 5/00* (2013.01); *H04B 5/06* (2013.01); *H04B 7/0805* (2013.01)
(58) Field of Classification Search
 CPC .................................................. H04B 7/0802
 USPC ................. 455/41.1, 41.2, 272, 277.1, 575.1; 343/751, 893
 See application file for complete search history.

(56) References Cited

U.S. PATENT DOCUMENTS

| | | | |
|---|---|---|---|
| 7,206,561 B2* | 4/2007 | Umemura et al. | 455/276.1 |
| 7,688,270 B2 | 3/2010 | Tsushima | |
| 7,711,335 B2 | 5/2010 | Morris et al. | |
| 8,417,205 B2* | 4/2013 | Tang et al. | 455/272 |
| 2006/0077039 A1* | 4/2006 | Ibi et al. | 340/10.1 |
| 2006/0128337 A1 | 6/2006 | Fujita et al. | |
| 2007/0178918 A1 | 8/2007 | Shon | |
| 2009/0073062 A1 | 3/2009 | Tang et al. | |
| 2010/0087146 A1 | 4/2010 | Han et al. | |

FOREIGN PATENT DOCUMENTS

| | | |
|---|---|---|
| EP | 2312428 A1 | 4/2011 |
| JP | 2000333097 A | 11/2000 |
| KR | 10-2010-0038790 | 4/2010 |
| WO | WO2007/004079 A1 | 1/2007 |
| WO | WO 2011/042051 A1 | 4/2011 |

OTHER PUBLICATIONS

International Search Report dated Sep. 26, 2013 in connection with International Patent Application No. PCT/KR2013/005730.
Extended EP Search Report in connection with EP Patent Application No. 13181644.9, dated Nov. 29, 2013, 6 pages.

* cited by examiner

*Primary Examiner* — Tuan H Nguyen

(57) ABSTRACT

An apparatus and a method for operating antennas. A terminal includes a plurality of short range wireless communication antennas, each antenna disposed on different surface or in a vicinity of the different surface of the terminal, and a short range wireless communication control module configured to control to select at least one of the plurality of short range wireless communication antennas.

20 Claims, 5 Drawing Sheets

APPARATUS AND METHOD FOR OPERATING ANTENNAS

CROSS-REFERENCE TO RELATED APPLICATION(S) AND CLAIM OF PRIORITY

The present application is related to and claims the benefit under 35 U.S.C. §119(a) of a Korean patent application No. 10-2012-0072017 filed on Jul. 3, 2012 in the Korean Intellectual Property Office, the entire disclosure of which is hereby incorporated by reference.

TECHNICAL FIELD OF THE DISCLOSURE

The present disclosure relates to antenna control, and more particularly, to an antenna control system, a terminal including the same, and a method of controlling an antenna that can more reliably form a communication channel of a short range wireless communication module.

BACKGROUND OF THE DISCLOSURE

Due to a small size to carry while providing a specific user function, mobile terminals has been spotlighted in industrial and living fields. Nowadays, mobile terminals integrally providing various user applications are available. Such a mobile terminal is equipped with a screen to display the user applications to a user.

When performing a communication function of the mobile terminal, the mobile terminal communicates with the base stations. In order to provide a communication service without interruption, communication technology designs a system such that the coverages of each of a plurality of base stations may be overlapped and the communication continuity is guaranteed during hand off.

SUMMARY

To address the above-discussed deficiencies of the prior art, it is a primary object to provide an antenna control system, a terminal including the same, and a method of controlling an antenna that can more reliably form a short range wireless communication channel.

In accordance with an aspect of the present disclosure, a terminal includes a plurality of short range wireless communication antennas disposed on or in vicinities of a plurality of surfaces of the terminal. A short range wireless communication control module sequentially selects the plurality of short range wireless communication antennas, but automatically selecting in an unit of N times (N is a positive integer) of a data transmission and reception operation cycle for a communication connection attempt defined in short range wireless communication and controlling to perform a communication connection attempt based on an automatically selected antenna. A switch switches to select one antenna, except for the automatically selected antenna, when a communication connection is failed based on a presently selected antenna in a unit of the N time operation cycles.

In accordance with another aspect of the present disclosure, a method of controlling an antenna includes selecting one of a plurality of short range wireless communication antennas. The method performs a manual mode of attempting a communication connection using the selected antenna or performing an automatic mode of attempting a communication connection in a unit of the N time (N is a positive integer) cycles of a data transmission and reception operation cycle defined in short range wireless communication using the selected antenna, automatically selecting, if the communication connection is failed, another antenna in a unit of the N time cycles, and performing a communication connection attempt based on the automatically selected antenna.

In accordance with another aspect of the present disclosure, a terminal includes a plurality of short range wireless communication antennas, each antenna disposed on different surface or in a vicinity of the different surface of the terminal. A switch is configured to switch antennas when a communication connection has been failed for N times of operation cycles. An input unit is configured to select one of a manual mode and an automatic mode for selecting at least one of a plurality of short range wireless communication antennas. A short range wireless communication control module is configured to select the at least one of a plurality of short range wireless communication antennas according to the selected mode.

An antenna control system includes a plurality of short range wireless communication antennas and a short range wireless communication control module for controlling to attempt a communication connection based on a designated antenna of the plurality of short range wireless communication antennas according to a manual mode and to sequentially select the plurality of short range wireless communication antennas according to an automatic mode, but to automatically select at a time point of N times (N is a positive integer) of a data transmission and reception operation cycle defined in short range wireless communication and to perform a communication connection attempt based on an automatically selected antenna, a switch for switching to select another antenna when a communication connection is failed based on an antenna selected in a unit of the N time operation cycles; an input unit for generating an input signal for setting one of the manual mode and the automatic mode, and a controller for controlling the mode setting according to an input signal of the input unit.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
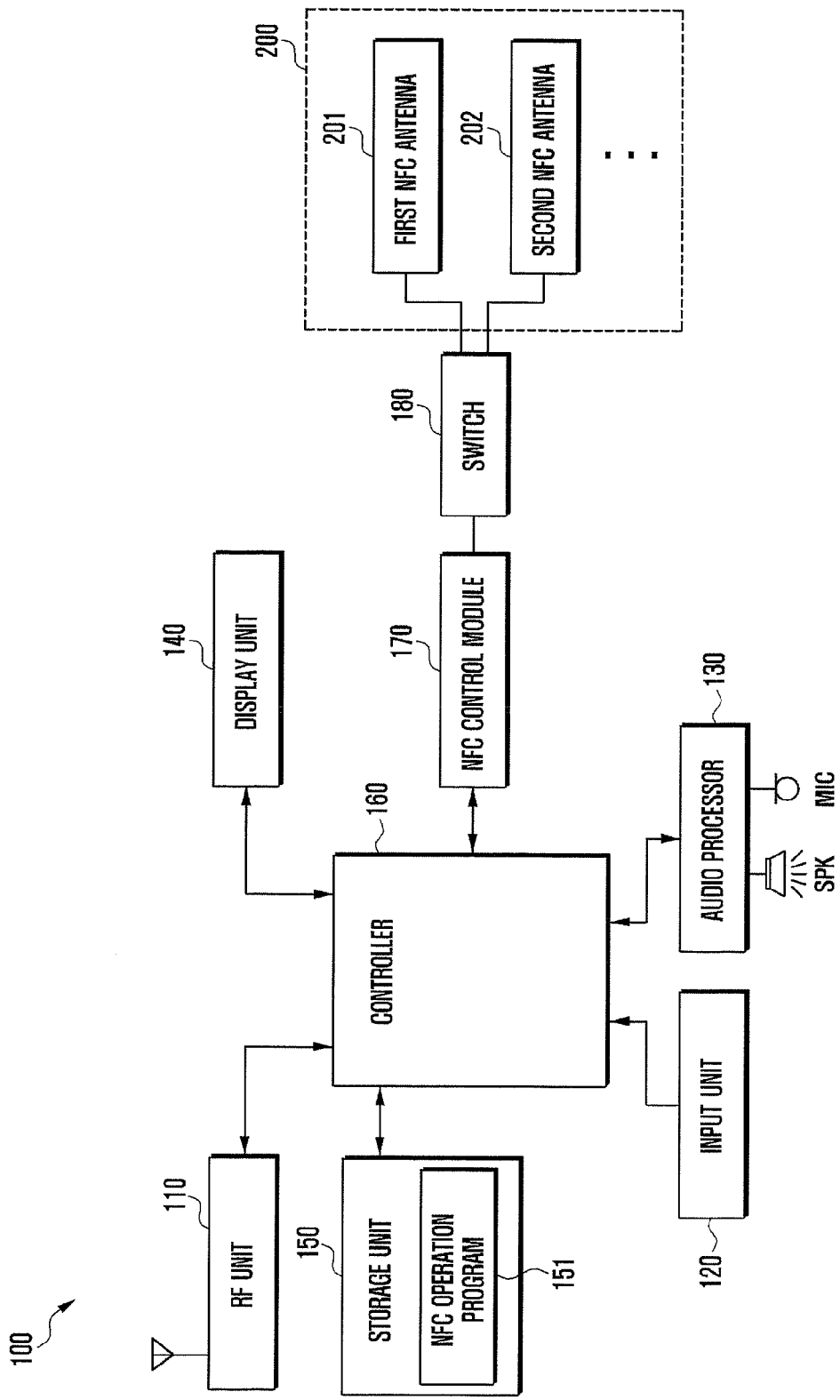
FIG. 1 is a block diagram illustrating a configuration of a terminal including an antenna control system according to an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless technologies. Hereinafter, exemplary embodiments of the present disclosure are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted to avoid obscuring the subject matter of the present disclosure.

While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated.

FIG. 1 is a high-level block diagram illustrating a configuration of a terminal for supporting a short range wireless communication according to an embodiment of the present disclosure.

Referring to FIG. 1, a terminal 100 according to the present exemplary embodiment includes a radio frequency (RF) unit 110, input unit 120, audio processor 130, display unit 140, storage unit 150, and controller 160 and can include an antenna module including a short range wireless communication control module, a switch, and a plurality of short range wireless communication antenna for supporting short range wireless communication. Here, a near field communication (NFC) control module 170 is a module for supporting NFC communication and can be an example of a short range wireless communication module.

In the terminal 100 with such a configuration, when a control signal for operating a short range wireless communication module is transmitted to the NFC control module 170, the NFC control module 170 controls to form a communication channel via a specific short range communication antenna located in an antenna module 200 according to preset schedule information, and when it is failed to form a communication channel, the NFC control module 170 controls a switch 180 to form a communication channel via another short range wireless communication antenna. In order to do that, the NFC control module 170 controls operation of the switch 180 that converts connection from a specific short range wireless communication antenna to another short range wireless communication antenna on a previously defined data transmission and reception operation cycle basis. Accordingly, the terminal 100 according to the present exemplary embodiment controls antenna conversion between antennas for a communication connection attempt on a data transmission and reception operation cycle basis in which a short range wireless communication module defines and thus reduces an unnecessary standby time in a communication channel forming process, and controls to form more reliably communication channel.

In the present exemplary embodiment, as a short range wireless communication module, a NFC related module is exemplified, but the present disclosure is not limited thereto. This is, an NFC related module of the present exemplary embodiment can be replaced with at least one of various communication modules that perform data transmission and reception for converting a communication connection with another short range wireless communication module based on a specific data transmission and reception operation cycle. Hereinafter, a structure in which the antenna module 200 includes two antennas is exemplified, but the present disclosure is not limited thereto. A detailed description thereof is described in detail later with reference to the drawings.

When the terminal 100 supports a long range communication function, the long range RF unit 110 for can be additionally included, and otherwise, the long range RF unit 110 can be omitted. In order to support a communication function of a terminal, the long range RF unit 110 forms a communication channel with a base station and receives information from the outside according to a user control or preset schedule information, or transmits information stored at the terminal 100 or information in which the terminal 100 collects to the outside. Particularly, the long range RF unit 110 can transmit information collected through a short range wireless communication channel formed through the NFC control module 170 to a specific network device or another terminal according to user schedule information. Further, the long range RF unit 110 can transmit information received from the outside to a specific terminal via a short range wireless communication channel through the NFC control module 170.

The input unit 120 generates various input signals necessary for operating the terminal 100. Such an input unit 120 can be formed as various input means such as a keyboard, a keypad, and a key button according to compatibility of the terminal 100. Further, when the display unit 140 is provided as a touch screen, the input unit 120 can be formed in a form of a touch map output to a touch screen. Particularly, the input unit 120 can generate various input signals for forming a short range wireless communication channel. For example, the input unit 120 can generate an input signal for selecting a short range wireless communication channel-based user function, an input signal that instructs to manually select a specific antenna of a plurality of antennas included in the antenna module 200, and an input signal that instructs to automatically select and convert a specific antenna of a plurality of antennas according to a user control or schedule information. The generated input signal is output to the controller 160 to be used as a command for performing a corresponding function.

The audio processor 130 outputs various audio data that is set in an operation process of the terminal 100, audio data according to audio file reproduction stored at the storage unit 150, and audio data received from the outside. Further, the audio processor 130 performs an audio data collection function. For this, the audio processor 130 includes a speaker SPK and a microphone MIC. Particularly, the audio processor 130 outputs various audio data related to a short range wireless communication channel operation. For example, the audio processor 130 outputs audio data for determining whether an antenna selection mode is a manual mode or an automatic mode in a short range wireless communication channel forming process, guidance sound according to selection of a manual mode or an automatic mode, guidance sound notifying formation of a short range wireless communication channel, and guide sound that instructs data transmission and reception. An output of audio data or guide sound of the audio processor 130 can be omitted according to user setting or a designer's intention.

The display unit 140 provides various images and videos necessary for operation of the terminal 100. For example, the display unit 140 provides a standby screen and a menu screen necessary for operation of the terminal 100. Particularly, the display unit 140 of the present exemplary embodiment displays a screen related to a short range wireless communication module operation. This is, the display unit 140 provides a screen for supporting to select a screen for selecting a user function related to a short range wireless communication module, a screen for selecting a manual mode or an automatic mode, and a screen for selecting a specific antenna of a plurality of antennas according to manual mode selection. Further, the display unit 140 outputs a screen that attempts to form a communication channel while converting a plurality of antennas according to a corresponding short range wireless communication module data transmission and reception operation cycle according to automatic mode selection and a screen according to short range wireless communication channel formation complete. In addition, after a short range wireless communication channel is formed, the display unit 140 provides a screen for transmitting specific data to another terminal or receiving specific data from another terminal according to a user control or preset schedule information. A screen interface provided through the display unit 140 is described in detail later with reference to the drawings.

The storage unit 150 stores data or an application program and algorithm corresponding to various basic operation systems and various user functions necessary for operation of the terminal 100. Particularly, in order to operate a short range wireless communication module of the present disclosure, the storage unit 150 stores an NFC operation program 151.

The NFC operation program 151 stores various routines necessary for a short range wireless communication function operation of the terminal 100. For example, the NFC operation program 151 can include a routine that provides a user function item related to a short range wireless communication function to the display unit 140 and a setting function providing routine that can determine whether to manually or automatically select a specific antenna of the antenna module 200 when a corresponding item is selected. Further, the NFC operation program 151 can include a routine that performs communication with a short range wireless communication channel based on a specific antenna of the antenna module 200 according to a selected mode and routine that outputs at least a portion of information transmitted and received according to a communication result. Here, when the terminal 100 according to one embodiment of the present disclosure does not support a manual mode that can select a specific antenna of the antenna module 200, the NFC operation program 151 does not include a setting function providing a routine related to a manual mode, and supports only an automatic mode when a short range wireless communication function is selected.

The controller 160 controls various message flow control and information collection and output necessary for operation of the terminal 100 according to one embodiment of the present disclosure. Particularly, when an input signal for operation the NFC control module 170 is received, the controller 160 outputs a control signal for operating a corresponding function to the NFC control module 170. The controller 160 also controls to output various images and videos related to operation of the NFC control module 170. For example, the controller 160 receives a signal corresponding to whether to operate a short range wireless communication function in a manual mode or in an automatic mode from the input unit 120 or preset schedule information and outputs the signal to the NFC control module 170.

The NFC control module 170 controls the switch 180 according to a signal output from the controller 160 to perform signal radiation and signal reception for a short range wireless communication function operation via a specific antenna in the antenna module 200. In more detail, when the NFC control module 170 receives a manual mode setting signal and a signal that instructs a specific antenna from the controller 160, the NFC control module 170 controls the switch 180 to select an antenna corresponding to the signal of the antenna module 200. The NFC control module 170 stands by transmission and reception of a previously defined signal based on the selected antenna. When a corresponding signal is not received for a preset data transmission and reception operation cycle time, the NFC control module 170 outputs a message thereof, for example a communication channel forming failure message to the controller 160.

When a failure message indicating not being able to operate a short range wireless communication function via a specific antenna is received in a manual mode state from the NFC control module 170, the controller 160 controls the display unit 140 to output the notification. The user recognizes that a short range wireless communication function cannot be operated through a specific antenna designated by the user or preset schedule information from the above notification, and performs an additional operation for selecting another antenna.

When the NFC control module 170 receives a control signal that instructs to operate an automatic mode-based short range wireless communication module function from the controller 160, the NFC control module 170 operates a communication function according to an automatic mode. This is, the NFC control module 170 selects a specific antenna of the antenna module 200 according to preset schedule information, and transmits and receives a signal necessary for a short range wireless communication function operation based on the selected antenna. In this case, when a normal signal is transmitted and received in an operation process via a corresponding antenna, the NFC control module 170 outputs a notification message thereof to the controller 160.

When transmission and reception of a signal based on a specific antenna is not normally performed, the NFC control module 170 outputs a failure message. For example, when preset data reception for data transmission defined for communication connection is not performed within a data transmission and reception operation cycle of a short range wireless communication module, the NFC control module 170 outputs a failure message to the controller 160. After a corresponding operation cycle has elapsed, the NFC control module 170 controls the switch 180 to automatically select unselected another antenna in the antenna module 200. The NFC control module 170 transmits and receives a specific data signal through unselected another antenna. Here, when a communication connection attempt through operation of an individual antenna is failed, the NFC control module 170 controls to complexly operate antennas, which is described later in detail with reference to the drawings.

When a notification message indicating the establishment of a short range wireless communication is received from the NFC control module 170, the controller 160 outputs the message to the display unit 140 to notify normal operation of a short range wireless communication function. Alternatively, when a specific antenna-based short range wireless communication by the NFC control module 170 is failed, the controller 160 controls to outputs a failure message corresponding thereto and to display a message informing that short range wireless communication channel formation is being attempted using another antenna.

The antenna module 200 includes a first NFC antenna 201 and a second NFC antenna 202 connected to the switch 180. As described above, the antenna module 200 of the one embodiment according to the present disclosure can be formed with two or more NFC antennas. The first NFC antenna 201 and the second NFC antenna 202 can be formed in respective predetermined patterns and can be mounted and disposed in a form such as a flexible printed circuit board (FPCB) or can be directly disposed at a specific position of the terminal 100. This is described in detail with reference to FIG. 2.

Figure 2:
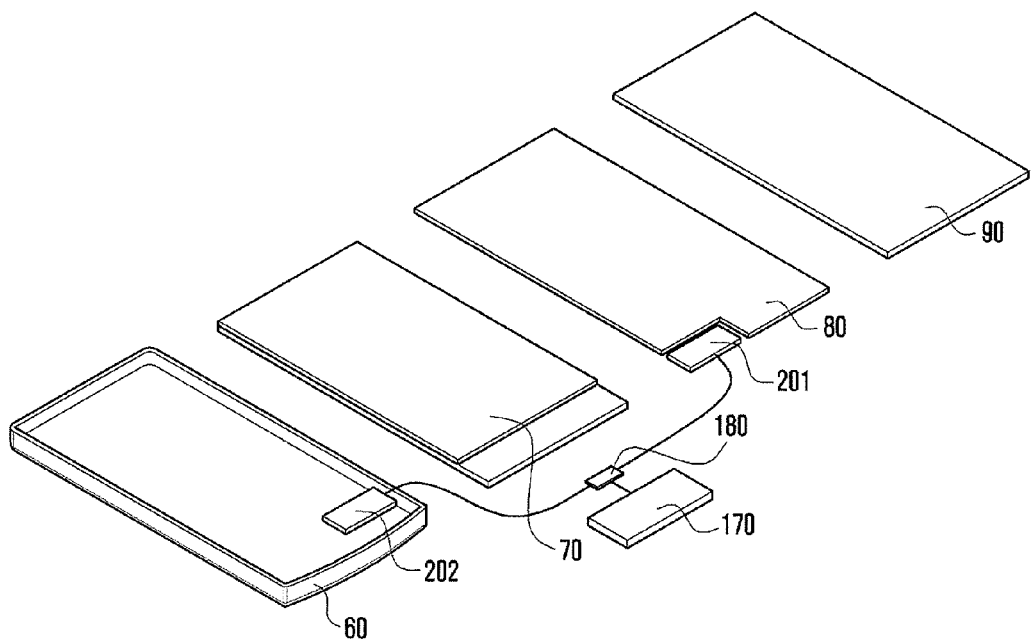
FIG. 2 is a perspective view illustrating a disposition of an antenna module in an antenna control system according to an embodiment of the present disclosure.

FIG. 2 is a perspective view illustrating a disposition of the antenna module 200 of the terminal 100 according to an embodiment of the present disclosure.

Referring to FIG. 2, the terminal 100 includes a case 60, display panel 70, touch panel 80, and upper plate glass 90 and can include the first NFC antenna 201 disposed on or in the vicinity of one side the touch panel 80, second NFC antenna 202 disposed on or in the vicinity of one side of the case 60, switch 180 for connecting one of the first NFC antenna 201 and the second NFC antenna 202, and NFC control module 170 for controlling the switch 180.

Since a certain portion, for example an upper end portion of the display panel 70, does not substantially displays information, the terminal 100 of such a configuration is designed to dispose the first NFC antenna 201 at one side of the upper end portion of the display panel 70. Further, in the touch panel 80 for panel operation, since a predetermined frequency signal is supplied, an interference phenomenon between the touch panel 80 and the first NFC antenna 201 can occur. Accordingly, by partially removing a portion in which the first NFC antenna 201 is disposed in a shape of the touch panel 80, the terminal 100 is designed to prevent that the touch panel 80 and the first NFC antenna 201 are substantially overlapped. The second NFC antenna 202 is disposed at a portion of the inside of the rear case 60 of the display panel 70 and does not occur interference phenomenon with the touch panel 80. In FIG. 2, the switch 180 and the NFC control module 170 are disposed at separate space, but the switch 180 and the NFC control module 170 can be substantially disposed at a predetermined area of a lower portion of the display panel 70 and the inside of the case 60.

In the terminal 100 designed to have the above-described structure, the first NFC antenna 201 is disposed at, for example, an upper end portion of a front side of the terminal 100, and the second NFC antenna 202 is disposed at, for example, an upper end portion of a rear side of the terminal 100. Here, the second NFC antenna 202 is disposed at one side of the case 60 disposed at a rear surface and can be disposed at various areas on the side intended by a designer, for example at least one portion of a lower end portion of a rear side or a lateral edge of a rear side depending on a position in which the first NFC antenna 201 is disposed as well as an upper end portion of a rear side. Alternatively, the second NFC antenna 202 can be disposed in a central portion of the case 60.

Accordingly, when a user wants to manually operate the second NFC antenna 202 while operating a short range wireless function of the terminal 100, the user can determine a disposition of a corresponding antenna and adaptively operate the second NFC antenna 202 based on the position operation. In a manual mode to select an NFC antenna of the terminal 100, it is necessary to determine a position of the antenna and thus the terminal 100 can provide the information on a screen. This is, when the user selects a specific short range wireless antenna, the terminal 100 of the embodiment can notify through an image or a text that each antenna belonging to the antenna module 200 is disposed at which position of the terminal 100. Therefore, the user can determine a position of a short range wireless antenna in which the user manually indicates using information provided through a corresponding screen and can adjust a holding method of the terminal 100 or a position of the terminal 100.

As described above, because the first NFC antenna 201 is disposed in an upper end direction of a front surface of the terminal 100, it is preferable that the first NFC antenna 201 is disposed in a direction opposite to a disposition direction of another short range wireless responder that supports a short range wireless function. Similarly, because the second NFC antenna 202 can be disposed at the center of a rear surface or an upper end direction of a rear surface of the terminal 100, it is preferable that another short range wireless responder is disposed opposite to an upper end portion of the rear surface or opposite to the center of the rear surface.

Therefore, in a state in which the terminal 100 presently operates based on the first NFC antenna 201, when another short range wireless responder is disposed at an upper end portion or at the center of the rear surface of the terminal 100, it can be difficult to form an appropriate communication channel. When the terminal 100 of the embodiment operates in an automatic mode in such a environment, if the terminal 100 attempts and fails a communication connection based on the first NFC antenna 201 for a certain number of cycles of data transmission and reception operation in a short range wireless module, the terminal 100 performs a communication connection by automatically converting a communication connection based on the second NFC antenna 202. Therefore, the user can smoothly use a short range wireless function without a manual antenna manipulation or a search of a failure cause of a communication connection.

As the terminal 100 provides a holding method or position of the terminal 100 in which the user habitually has in a specific short range wireless function in which the user generally uses through operation of a manual mode, the user can conveniently use a short range wireless function without a manual automatic manipulation. This is, for a service in which the user frequently uses, by using a fixed antenna instead of unnecessarily switching an antenna, delay according to switch operation and antenna conversion can be removed.

In addition, after a manual mode has been operated for a predetermined time period, when a communication connection is failed for a predetermined time period, the terminal 100 of the embodiment can be automatically converted to an automatic mode. This is, the terminal 100 have been operated in a manual mode based on a specific antenna set as a default, and when a failure occurs, the terminal 100 is converted to an automatic mode, and thus inconveniency in which the user selects an automatic mode for short range wireless connection can be solved. For this, in order for the user to enable to select an item that supports to convert to an automatic mode after performing a manual mode for a predetermined time period together with other modes, the terminal 100 can output the items to the display unit.

Here, another short range wireless object can be a specific target for forming an NFC short range wireless channel, such as an antenna of an NFC short range wireless module mounted in an RFID tag, a reader, or another terminal.

Figure 3:
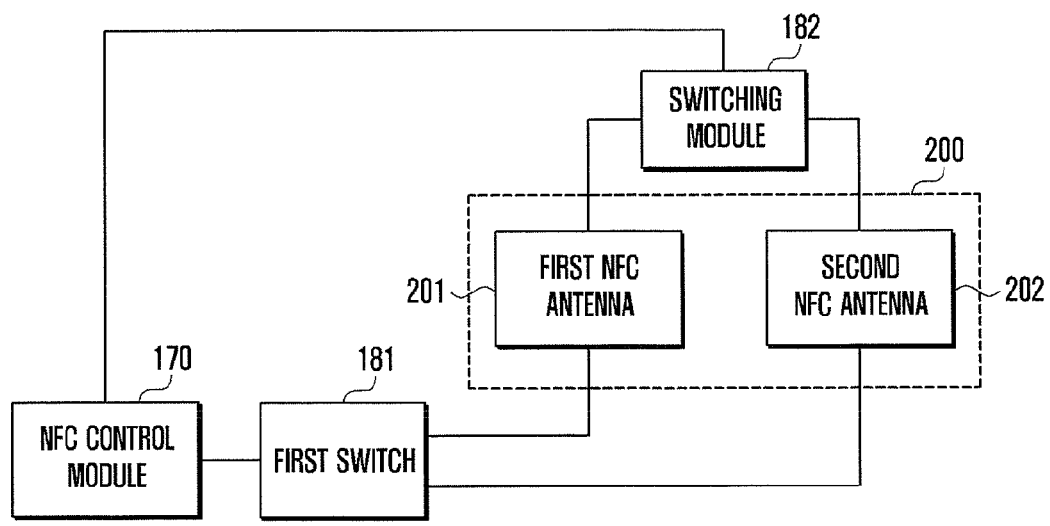
FIG. 3 is a block diagram illustrating a configuration of an antenna control system according to another embodiment the present disclosure.

FIG. 3 is a high-level block diagram illustrating a configuration of a terminal for a short range wireless function operation according to another embodiment of the present disclosure.

Referring to FIG. 3, the terminal 100 according to the embodiment includes the NFC control module 170, a first switch 181, a switching module 182, and the antenna module 200.

The NFC control module 170 controls the first switch 181 to automatically convert between the first NFC antenna 201 and the second NFC antenna 202 in the manual mode or the automatic mode, and attempts a short range wireless connection.

Even if both the first NFC antenna 201 and the second NFC antenna 202 are operated, when a communication connection is failed, the NFC control module 170 of the terminal 100 according to another embodiment of the present disclosure controls to integrate and operate at least two antennas of the antenna module 200 included in the terminal 100. For this, the terminal 100 can further include the switching module 182 for performing impedance matching and frequency transition while electrically connecting the first NFC antenna 201 and the second NFC antenna 202.

Here, in an environment that separately operates the first NFC antenna 201 and the second NFC antenna 202 through the control of the first switch 181, the switching module 182 performs a function of separating the first NFC antenna 201 and the second NFC antenna 202. When wanting to integrate and operate the first NFC antenna 201 and the second NFC antenna 202, the switching module 182 performs a function of electrically connecting two antennas, and the terminal 100 can further include an element for performing impedance matching of antennas. Further, a frequency performance of an antenna is affected by antenna length increase by an electrical connection of two antennas and thus the terminal 100 can further include a filter element for adjusting a frequency performance of an antenna.

Further, when the first NFC antenna 201 and the second NFC antenna 202 are connected using the switching module 182, in order to maintain good communication efficiency, the NFC control module 170 transmits a communication signal with a relatively higher output than that of an embodiment in which either one antenna operates. Therefore, in the terminal 100 of the present exemplary embodiment, by integrating and operating the first NFC antenna 201 and the second NFC antenna 202, damage occurs, but a better signal environment can be provided through, for example, additional power supply and a disposition of additional elements.

When a short range wireless communication module is an NFC module, a cycle for one data transmission and reception operation can be 333 milliseconds, and thus an operation cycle of the switch 180 or the first switch 181 can be a unit of 333 milliseconds. Therefore, the terminal 100 performs a signal processing for determining whether short range wireless antennas included in the antenna module 200 can communicate with another short range wireless module in an operation cycle unit of 333 milliseconds or in an operation cycle unit of the predetermined number of times. In this case, when the number of antennas included in the antenna module 200 increases, the terminal 100 performs signal transmission and standby necessary for determining whether communication connection of more antennas is available according to a corresponding data transmission and reception operation cycle. For example, when four (4) short range wireless antennas are disposed, the terminal 100 can perform a signal processing for determining whether each antenna can perform communication connection in a unit of 333 milliseconds or in a unit of the integer times of 333 milliseconds.

Here, four antennas can be disposed in at least two locations of an upper end portion of the front surface, a lower end portion of a front surface, an upper end portion of a rear surface, and a lower end portion of a rear surface of the terminal 100 and can be disposed in at least one of an upper end portion and a lower end portion of a side surface according to a designer's intention. Further, the switching module 182 can be provided in a form that connects at least two of the four antennas and thus the terminal 100 can control to use an integrated antenna of a form in which at least two antennas are connected for short range wireless, as needed. In this case, the terminal 100 can supply requested additional power according to the increased antenna number, and a designer can perform an additional design for frequency matching necessary for forming a short range wireless channel by connecting the more number of antennas.

In the foregoing description, for a short range wireless module operation, a data transmission and reception operation cycle with a unit of 333 milliseconds has been described, however the present disclosure is not limited thereto. This is, the terminal 100 controls switching of antennas according to a data transmission and reception operation cycle defined in each type of a short range wireless module. For example, in order to form a channel, when the short range wireless module is designed to transmit and receive a signal in a unit of 200 milliseconds, the data transmission and reception operation cycle can be determined in a unit of 200 milliseconds or the integer times of 200 milliseconds.

In the terminal 100 of the present exemplary embodiment, the same short range wireless module can be set to have different operation cycles according to the number of short range wireless antennas included in the antenna module 200. For example, in the antenna module 200 including 4 short range wireless antennas, the terminal 100 can control a switching time upon the communication failure for 2N times (N is a positive integer) of a data transmission and reception operation cycle defined in a corresponding short range wireless module. In the antenna module 200 including two short range wireless antennas, the terminal 100 can control the switching time by adjusting the number of N of a data transmission and reception operation cycle. That is, when the terminal 100 includes relatively many short range wireless antennas, the terminal 100 can determine an operation cycle unit switching time in a form that reduces a delay time, and when the terminal 100 includes relatively few short range wireless antennas, for reliability security of communication availability of each antenna, the terminal 100 can determine a switching time in a form of increasing a communication availability determination time of a specific antenna. For example, in order to determine communication connection availability of each antenna, if 333 milliseconds are allocated to the terminal 100 including 4 short range wireless antennas, 666 milliseconds are allocated to the terminal 100 including two short range communication connection antennas.

Figure 4:
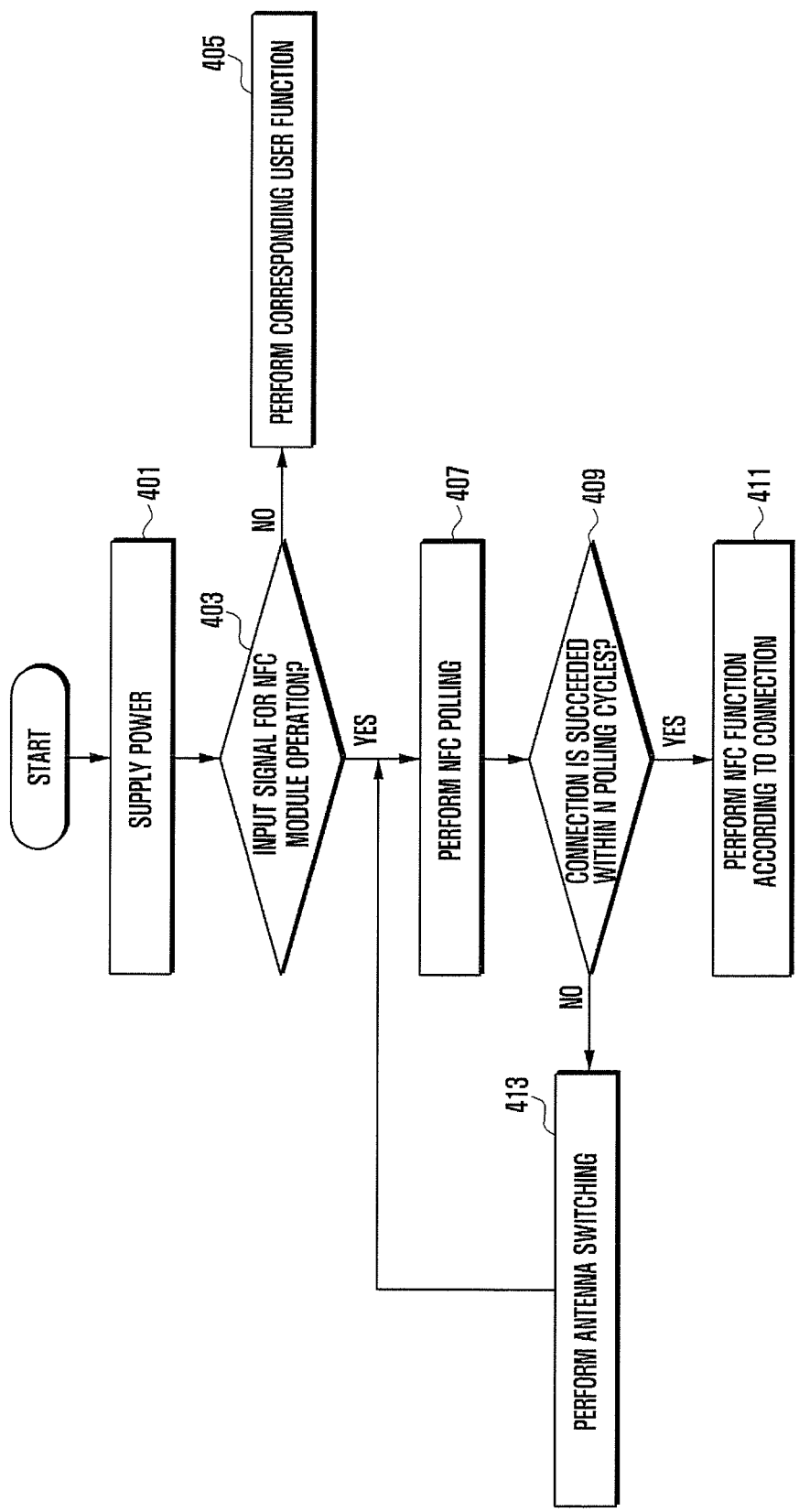
FIG. 4 is a flowchart illustrating a method of controlling an antenna according to an embodiment of the present disclosure.

FIG. 4 is a flowchart illustrating a method of controlling an antenna of the terminal 100 according to an exemplary embodiment of the present disclosure.

Hereinafter, an NFC is illustrated as an example of a short range wireless module.

Referring to FIG. 4, in a method of controlling an antenna according to the present exemplary embodiment, the controller 160 of the terminal 100 controls to supply power to constituent elements of the terminal 100 in step 401. Such power supply is performed to constituent elements necessary for operation of the terminal 100, and particularly, for a short range wireless function operation, power is supplied to the storage unit 150, the display unit 140, and the input unit 120.

When an input signal is input through the input unit 120 or the display unit 140 of an input function, the controller 160 determines whether the input signal is an input signal for an NFC module operation in step 403.

If the input signal is not an input signal for an NFC module operation, the controller 160 performs a user function according to a corresponding input signal in step 405. For example, the controller 160 can perform a communication function, a file search function, a file reproduction function, a file edition function, a broadcasting reception function, or a web connection function according to an input signal.

If the input signal is an input signal for an NFC module operation, the controller 160 controls to perform an NFC detection process. The NFC detection process calls the NFC operation program 151 stored at the storage unit 150 to perform a short range wireless function support and loads the NFC operation program 151 to the controller 160.

The controller 160 controls to perform NFC polling corresponding to data transmission and reception for communication connection in step 407. For this, the controller 160 outputs a control authority for NFC detection to the NFC control module 170, and the NFC control module 170 controls to transmit a previously defined detection signal through a specific antenna according to the control authority and stands by to receive a response signal to the signal transmitted through a corresponding antenna.

The controller 160 determines whether a connection is succeeded within N polling cycles (N is a positive integer) in step 409. Here, the N polling cycle can be the previously designated polling number of times in the NFC detection process. That is, the foregoing description describes that a polling cycle for NFC detection can be 333 milliseconds, but the NFC control module 170 can repeat a corresponding polling cycle several times according to previously defined schedule information. Accordingly, the controller 160 determines whether a connection is succeeded through reception of a normal response signal from another short range wireless communication module within a previously defined N polling cycle.

If a connection is not succeeded within N polling cycles, the NFC control module 170 controls to perform antenna switching in step 413. Here, an antenna switching process can be one of a switching process of selecting another antenna other than an antenna that presently attempts a connection in a plurality of antennas and a switching process of switching to operate an integrated antenna, as described above.

After step 413, the process returns to step 407. Such a connection attempt process can be repeatedly performed by the previously defined predetermined number of times, or can be repeatedly perform until the user requests stop.

If a connection has been succeeded within N polling cycles at step 409, the NFC control module 170 performs a short range wireless function according to the connection (411).

The controller 160 provides various screens according to antenna switching, connection attempt, connection failure, and connection success of the NFC control module 170 through the display unit 140. This is described in detail with reference to FIG. 5.

Figure 5:
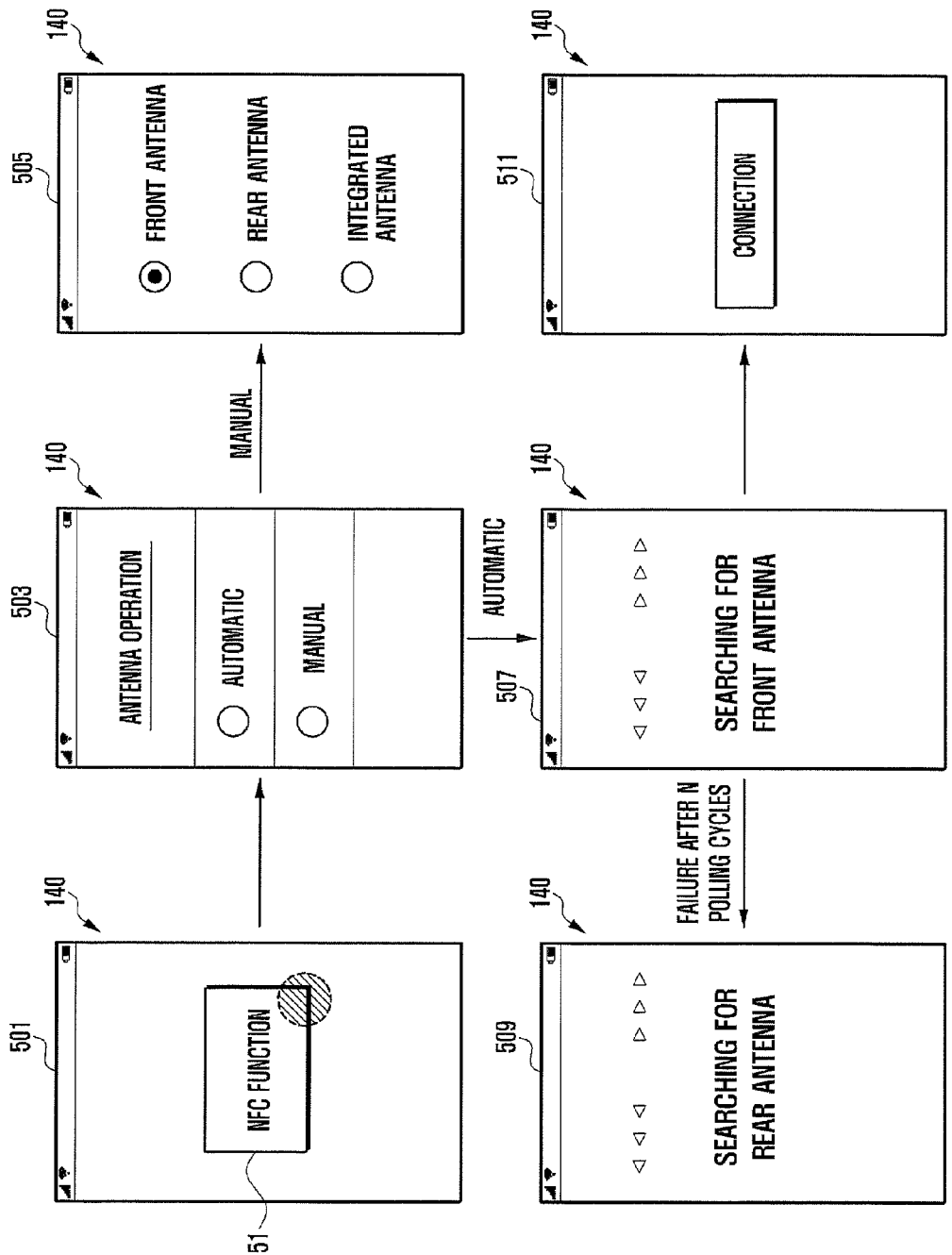
FIG. 5 is a diagram illustrating an antenna control related screen interface output through the terminal of FIG. 1.

FIG. 5 illustrates an antenna control related screen interfaces on a display unit of a terminal according to an exemplary embodiment of the present disclosure.

Referring to FIG. 5, when a power supply state is maintained for use of the terminal 100, the terminal 100 displays a menu related to a short range wireless function to the display unit 140, as shown on a screen 501 according to preset schedule information or a user input. Here, the screen 501 illustrates that a short range wireless function is an NFC function. For activation of an NFC function, the user can select an NFC item 51, for example, by a touch action for selecting the NFC item 51.

Therefore, the terminal 100 outputs a screen allowing to select an antenna operation mode to the display unit 140, as shown on a screen 503. The antenna operation menu configured to enable a selection of one mode of a manual mode and an automatic mode. Here, the terminal 100 can provide a mode that converts to an automatic mode when a predetermined period has elapsed after performing a basic manual mode, and in this case, an item related to a corresponding mode can be further displayed on the screen 503.

When the user selects a manual mode on the screen 503, the terminal 100 can provide a screen for selection a specific antenna related to a manual mode, as shown on a screen 505. The screen 505 can include items allowing to select one of an integrated antenna and two antennas, i.e., a front antenna corresponding to the first NFC antenna 201 and a rear antenna corresponding to the second NFC antenna 202 shown in FIG. 2.

The user can randomly designate a specific antenna in consideration of a state in which the user usually holds the terminal 100 or a disposition of the terminal 100 for a short range wireless function operation. Therefore, when a short range wireless function operates, the terminal 100 attempts a communication connection based on a designated specific antenna and performs processing of a connection or a failure.

Here, an integrated antenna is an example that simultaneous connects and operates a front antenna and a rear antenna, as described above. For integrated antenna operation, the terminal 100 can provide an element design for impedance matching and frequency transition for frequency band matching for a determined NFC module operation. Further, in order to satisfy antenna efficiency provided by previous antennas based on an increased antenna length, the NFC control module 170 can supply additional power.

An element for the impedance matching and frequency transition can be designed in consideration of various antenna environments such as line resistance of a line connected to the number of antennas included in the antenna module 200, a resistance value of a used switch element, and parasitic capacitance of a switch element. Further, in an additional power supply process in which the NFC control module 170 performs, additional power can be supplied based on a condition for obtaining antenna efficiency obtained when one antenna operates, and additional power can be supplied to obtain high efficiency corresponding to an increased antenna length.

When an automatic mode is selected in a state of the screen 503, the terminal 100 performs a communication connection for a short range wireless function operation based on preset schedule information, for example a front antenna. Accordingly, the terminal 100 outputs a message notifying that a search function is performing based on a front antenna to the display unit 140, as shown on a screen 507.

Thereafter, the terminal 100 performs a front antenna search for N polling cycles and performs antenna switching on a screen 509 if a front antenna search for N polling cycles is failed. That is, the terminal 100 switches to release a connection state of the front antenna and to connect a rear antenna. The terminal 100 attempts a communication connection using the changed rear antenna, as shown on the screen 509. Here, when a communication connection succeeds, the terminal 100 outputs at least one of a pop-up window representing that communication is connected and a data transmission and reception screen according to communication connection to the display unit 140, as shown on a screen 511.

When a communication connection is succeeded using the front antenna, as shown on the screen 507, the terminal 100 outputs a screen corresponding to a communication connection success, as shown on a screen 511. Even if both the front antenna and the rear antenna are operated, when a communication connection is failed, if the terminal 100 performs an integrated antenna operation mode, the terminal 100 performs an integrated antenna operation, and in this process, the terminal 100 outputs a corresponding screen. Even if the terminal 100 attempts a communication connection using antennas included in the antenna module 200, when the communication connection is failed, the terminal 100 outputs a message according to a communication connection failure.

As described above, in an antenna control system, a terminal including the same, and a method of controlling an antenna according to an exemplary embodiment of the present disclosure, when operating a short range wireless function, by alternately operating a plurality of antennas, in an antenna environment, a better communication connection attempt can be performed. Particularly, in a system and method for controlling an antenna according to the present exemplary embodiment, by setting a conversion time point of a plurality of antennas according to a data transmission and reception operation cycle of each short range wireless function, by saving an unnecessary standby time in an attempt process for communication connection, an optimal antenna search can be performed. Further, in a system and method for controlling an antenna according to the present exemplary embodiment, by operating one of a manual mode, an automatic mode, and a semiautomatic mode according to a user selection, an antenna in which a user prefers can be selected and operated, and a good operation method can be performed. In the present exemplary embodiment, a communication connection attempt can be maximized through an integrated antenna operation mode, as needed.

The terminal 100 can further include various additional modules according to a providing form. This is, the terminal 100 can further include constituent elements that do not described in the foregoing description, such as a short range communication module for short range wireless communication, an interface for data transmission and reception by a wired communication method or a wireless communication method of the terminal 100, an Internet communication module for performing an Internet function by communicating with an Internet network, and a digital broadcasting module for performing a digital broadcasting reception and reproduction function. Further, in the terminal 100 of the present exemplary embodiment, a specific constituent element can be excluded in the above constituent elements or the above constituent element can be replaced with another constituent element according to a providing form.

Further, the terminal 100 according to an exemplary embodiment of the present disclosure can include information and communication devices and multimedia devices such as a portable multimedia player (PMP), digital broadcasting player, personal digital assistant (PDA), music player (e.g., MP3 player), mobile game terminal, smart phone, laptop computer, and hand-held PC as well as mobile communication terminals operating based on communication protocols corresponding to various communication systems and application devices thereof.

As described above, in an antenna control system, a terminal including the same, and a method of controlling an antenna according to the present disclosure, various short range wireless communication connection environment control can be provided to a user, and even if the user does not control a state change of the terminal according to user selection, the terminal can automatically perform antenna control for short range wireless communication channel formation and thus a short range wireless communication channel can be more reliably formed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A terminal, comprising:
   a switch;
   a plurality of short range wireless communication antennas comprising a first short range wireless communication antenna disposed at least substantially near a first side of the terminal, and a second short range wireless communication antenna disposed at least substantially near a second side of the terminal, the first side and the second side being opposite to each other;
   a short range wireless communication control module configured to:
      cause the switch to switch from the first short range wireless communication antenna to the second short range wireless communication antenna in response to the first short range wireless antenna failing to establish a communication connection for at least one time of an operation cycle; and
      designate one of the plurality of the short range wireless communication antennas to be selected for a short range service.

2. The terminal of claim 1, wherein the short range wireless communication control module is a near field communication (NFC) control module, and
   an one time operation cycle is 333 milliseconds corresponding to an NFC one time polling cycle.

3. The terminal of claim 1, wherein the short range wireless communication control module forms a short range wireless communication channel based on an antenna of a success time point, when the communication connection attempt succeeds.

4. A terminal comprising:
   a plurality of short range wireless communication antennas, each short range wireless communication antenna disposed on a different surface or in a vicinity of the different surface of the terminal;
   a short range wireless communication control module configured to select at least one of the plurality of short range wireless communication antennas; and
   a switch configured to:
      switch short range wireless communication antennas in response to a communication connection failing for N times of an operation cycle;
      form an integrated antenna by selectively connecting at least two antennas of the plurality of short range wireless communication antennas and that performs impedance matching and frequency transition of the antennas, wherein the short range wireless communication control module is configured to designate one of the plurality of the short range wireless communication antennas to be selected for a short range service, wherein the short range wireless communication control module is configured to supply a higher power to the integrated antenna, compared to a power to be supplied when operating one short range wireless communication antenna in order to support efficiency of the integrated antenna.

5. A terminal, comprising:
a plurality of short range wireless communication antennas, each antenna disposed on different surface or in a vicinity of the different surface of the terminal;
a short range wireless communication control module configured to control to select at least one of the plurality of short range wireless communication antennas; and
a switch configured to switch antennas when a communication connection has been failed for N times of an operation cycle,
wherein the short range wireless communication control module is configured to provide a plurality of mode selections to attempt a communication connection via a specific short range wireless communication antennas according to one of a plurality of mode selections, wherein a manual mode attempts communication connection via manually selected antenna, and an automatic mode attempts communication connection via sequentially selected antenna after a predetermined time period has elapsed.

6. A terminal comprising an antenna control system, comprising:
a plurality of short range wireless communication antennas comprising a first short range wireless communication antenna disposed at least substantially near a first side of the terminal, and a second short range wireless communication antenna disposed at least substantially near a second side of the terminal, the first side and the second side being opposite to each other;
a switch configured to switch from the first short range wireless communication antenna to the second short range wireless communication antenna in response to the first short range wireless antenna failing to establish a communication connection for at least one time of an operation cycle;
an input unit configured to select one of a manual mode and an automatic mode for selecting at least one of a plurality of short range wireless communication antennas; and
a short range wireless communication control module configured to select the at least one of a plurality of short range wireless communication antennas according to the selected mode, wherein the short range wireless communication control module is configured to sequentially select the at least one of the plurality of short range wireless communication antennas according to the automatic mode,
wherein the short range wireless communication control module is further configured to designate one of the plurality of the short range wireless communication antennas to be switched for a short range service.

7. The terminal of claim 6, wherein the short range wireless communication control module is an NFC control module, and a unit time of the operation cycle is 333 milliseconds corresponding to an NFC one time polling cycle.

8. The terminal of claim 6, wherein the plurality of short range wireless communication antennas are disposed in at least two portions of an upper end portion of a front surface, a lower end portion of a front surface, an upper end portion of a rear surface, a lower end portion of a rear surface, an upper end portion of a side surface, and a lower end portion of a side surface of the terminal.

9. The terminal of claim 6, further comprising a display unit configured to provide at least one screen of:
a mode selection screen that can select one of the manual mode or the automatic mode;
an antenna selection screen that can select one of the plurality of short range wireless communication antennas according to selection of the manual mode;
an operation screen of an antenna that presently attempts a communication connection among the plurality of short range wireless communication antennas according to selection of the automatic mode; and
a notification screen that either represents a success of a communication connection attempt or a failure of a communication connection.

10. The terminal of claim 9, wherein the mode selection screen comprises a mode item that converts to an automatic mode after operating a manual mode for a predetermined time period.

11. The terminal of claim 9, wherein the antenna selection screen further comprises an item that configured to select an integrated antenna in which at least two antennas are integrated.

12. A terminal comprising an antenna control system, comprising:
a plurality of short range wireless communication antennas, each short range wireless communication antenna disposed on a different surface or in a vicinity of the different surface of the terminal;
a switch configured to switch antennas in response to a communication connection failing for N times of operation cycles;
an input unit configured to receive an instruction for selecting one of a manual mode and an automatic mode for selecting at least one of a plurality of short range wireless communication antennas; and
a short range wireless communication control module configured to:
select the at least one of a plurality of short range wireless communication antennas according to the selected mode;
sequentially select the at least one of the plurality of short range wireless communication antennas according to in response to a selection of the automatic mode when connection has failed for N times of a data transmission and reception operation cycle; and
designate one of the plurality of the short range wireless communication antennas to be selected for a short range service,
wherein when the plurality of short range wireless communication antennas are operated, the short range wireless communication control module is configured to supply a higher power than a power to be supplied if the one short range wireless communication antenna is operated.

13. A terminal comprising an antenna control system, comprising:
a plurality of short range wireless communication antennas, each antenna disposed on different surface or in a vicinity of the different surface of the terminal;

a switch configured to switch antennas if a communication connection has been failed for N times of operation cycles;

an input unit configured to select one of a manual mode and an automatic mode for selecting at least one of a plurality of short range wireless communication antennas; and a short range wireless communication control module configured to select the at least one of a plurality of short range wireless communication antennas according to the selected mode, wherein the short range wireless communication control module is configured to sequentially select the at least one of the plurality of short range wireless communication antennas according to the automatic mode, if connection has been failed for N times of a data transmission and reception operation cycle;

a display unit configured to display a complex mode set to operate an automatic mode after operating a manual mode for a predetermined time period, wherein the short range wireless communication control module controls to attempt a communication connection based on a specific antenna of the plurality of short range wireless communication antennas according to preset schedule information or an input signal, if the complex mode is selected and to perform an automatic communication connection attempt according to selection of an automatic mode after a predetermined time period has elapsed.

14. A method for controlling an antenna, the method comprising:

preparing a plurality of short range wireless communication antennas comprising a first short range wireless communication antenna disposed at least substantially near a first side of the terminal, and a second short range wireless communication antenna disposed at least substantially near a second side of the terminal, the first side and the second side being opposite to each other; and switching from the first short range wireless communication antenna to the second short range wireless communication antenna in response to the first short range wireless communication antenna failing to establish a communication connection for at least one time of a data transmission and reception operation cycle via the selected antenna, wherein one of the plurality of the short range wireless communication antenna is designated as a dedicated short range wireless communication antenna for a short range service.

15. The method of claim 14, wherein the short range wireless communication control module is an NFC control module, and an one time operation cycle is 333 milliseconds corresponding to an NFC one time polling cycle.

16. The method of claim 14, further comprising at least one process of:

displaying a mode selection screen that can select one of the manual mode or the automatic mode;

displaying an antenna selection screen that can select one of the plurality of short range wireless communication antennas according to selection of the manual mode;

displaying an operation screen of an antenna that presently attempts a communication connection among the plurality of short range wireless communication antennas according to selection of the automatic mode;

displaying a notification screen that either represents a success of a communication connection attempt or a failure of a communication connection.

17. The method of claim 16, further comprising at least one process of:

displaying a mode item that converts to an automatic mode after operating a manual mode for a predetermined time period on the mode selection screen; and displaying an item that configured to select an integrated antenna in which at least two antennas are integrated on the antenna selection screen.

18. The method of claim 14, wherein the plurality of short range wireless communication antennas are disposed in at least two portions of an upper end portion of a front surface, a lower end portion of a front surface, an upper end portion of a rear surface, a lower end portion of a rear surface, an upper end portion of a side surface, and a lower end portion of a side surface of the terminal.

19. A method for controlling an antenna, the method comprising:

selecting at least one of a plurality of short range wireless communication antennas, each short range wireless communication antenna disposed on a different surface or in a vicinity of the different surface of the terminal; and attempting a communication connection for N times of a data transmission and reception operation cycle via the selected antenna, wherein one of the plurality of the short range wireless communication antennas is designated to be selected for a short range service, forming an integrated antenna by selectively connecting at least two antennas of the plurality of short range wireless communication antennas and performing impedance matching and frequency transition of the antennas; and supplying higher power than power for one short range wireless communication antenna operation.

20. A method of controlling an antenna, the method comprising:

selecting at least one of a plurality of short range wireless communication antennas, each antenna disposed on different surface or in a vicinity of the different surface of the terminal; and attempting a communication connection for N times of a data transmission and reception operation cycle via the selected antenna, attempting a communication connection based on a specific antenna of the plurality of short range wireless communication antennas according to preset schedule information or an input signal before performing the automatic mode;

performing, if a communication connection is failed after a predetermined time period has elapsed, the automatic mode; and forming, if a communication connection is succeeded, a short range wireless communication channel based on a specific antenna.

* * * * *